(12) United States Patent
Crawford et al.

(10) Patent No.: US 8,200,609 B2
(45) Date of Patent: Jun. 12, 2012

(54) CONSTRUCTION OF DECISION LOGIC WITH GRAPHS

(75) Inventors: Stuart L. Crawford, Piedmont, CA (US); Michael Steele, Michigan City, IN (US); Prasun Kumar, Karnataka (IN); Sergei Tolmanov, Walnut Creek, CA (US); Megan Thorsen, Sunnyvale, CA (US); Chris Erickson, El Cerrito, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 818 days.

(21) Appl. No.: 12/201,839

(22) Filed: Aug. 29, 2008

(65) Prior Publication Data

US 2009/0058859 A1 Mar. 5, 2009

(30) Foreign Application Priority Data

Aug. 31, 2007 (IN) .......................... 1846/DEL/2007

(51) Int. Cl.
*G06F 17/00* (2006.01)
*G06N 7/00* (2006.01)
*G06N 7/08* (2006.01)

(52) U.S. Cl. ......................................................... 706/59
(58) Field of Classification Search .................... 706/59
See application file for complete search history.

(56) References Cited

U.S. PATENT DOCUMENTS

| | | | |
|---|---|---|---|
| 5,515,487 A | 5/1996 | Beaudet et al. | |
| 5,528,735 A | 6/1996 | Strasnick et al. | |
| 5,537,630 A | 7/1996 | Berry et al. | |
| 5,546,529 A | 8/1996 | Bowers et al. | |
| 5,603,025 A | 2/1997 | Tabb et al. | |
| 5,608,898 A | 3/1997 | Turpin et al. | |
| 5,623,541 A | 4/1997 | Boyle et al. | |
| 5,644,686 A | 7/1997 | Hekmatpour | |
| 5,682,487 A | 10/1997 | Thomson | |
| 5,692,107 A | 11/1997 | Simoudis et al. | |
| 5,696,885 A | 12/1997 | Hekmatpour | |
| 5,701,137 A | 12/1997 | Kiernan et al. | |
| 5,701,400 A | 12/1997 | Amado | |
| 5,710,896 A | 1/1998 | Seidl | |
| 5,720,007 A | 2/1998 | Hekmatpour | |
| 5,742,836 A | 4/1998 | Turpin et al. | |
| 5,745,712 A | 4/1998 | Turpin et al. | |
| 5,787,416 A | 7/1998 | Tabb et al. | |

(Continued)

FOREIGN PATENT DOCUMENTS

EP 0690367 1/1996

(Continued)

OTHER PUBLICATIONS

B. Gaines, "Transforming Rules and Trees into Comprehensible Knowledge Structures", Advances in Knowledge Discovery and Data Mining, 1996, pp. 1-18.*

(Continued)

*Primary Examiner* — Jeffrey A Gaffin
*Assistant Examiner* — Vincent Gonzales
(74) *Attorney, Agent, or Firm* — Mintz, Levin, Cohn, Ferris, Glovsky and Popeo, P.C.

(57) ABSTRACT

Data characterizing a plurality of related action graphs is received. Thereafter, the plurality of related action graphs are transformed into a logically equivalent structure so that rendering of the logically equivalent structure can be initiated. Related interfaces, apparatus, systems, techniques and articles are also described.

6 Claims, 3 Drawing Sheets

U.S. PATENT DOCUMENTS

| | | |
|---|---|---|
| 5,796,932 A | 8/1998 | Fox et al. |
| 5,806,056 A | 9/1998 | Hekmatpour |
| 5,806,256 A | 9/1998 | Byrne |
| 5,815,415 A | 9/1998 | Bentley et al. |
| 5,818,155 A | 10/1998 | Kawamura et al. |
| 5,822,745 A | 10/1998 | Hekmatpour |
| 5,870,559 A | 2/1999 | Lesham et al. |
| 5,870,768 A | 2/1999 | Hekmatpour |
| 5,875,431 A | 2/1999 | Heckman et al. |
| 5,890,131 A | 3/1999 | Ebert et al. |
| 5,917,492 A | 6/1999 | Bereiter et al. |
| 5,920,873 A | 7/1999 | Van Huben et al. |
| 5,930,764 A | 7/1999 | Melchione et al. |
| 5,953,017 A | 9/1999 | Beach et al. |
| 5,953,707 A | 9/1999 | Huang et al. |
| 5,958,008 A | 9/1999 | Pogrebisky et al. |
| 5,966,126 A | 10/1999 | Szabo |
| 5,966,695 A | 10/1999 | Melchione et al. |
| 5,974,127 A | 10/1999 | Wernli et al. |
| 5,982,370 A | 11/1999 | Kamper |
| 5,987,242 A | 11/1999 | Bentley et al. |
| 5,999,192 A | 12/1999 | Selfridge et al. |
| 6,014,138 A | 1/2000 | Cain et al. |
| 6,073,138 A | 6/2000 | de l'Etraz et al. |
| 6,078,324 A | 6/2000 | Phathayakorn et al. |
| 6,088,693 A | 7/2000 | Van Huben et al. |
| 6,089,453 A | 7/2000 | Kayser et al. |
| 6,094,654 A | 7/2000 | Van Huben et al. |
| 6,108,004 A | 8/2000 | Medl |
| 6,111,578 A | 8/2000 | Tesler |
| 6,112,202 A | 8/2000 | Kleinberq |
| 6,134,706 A | 10/2000 | Carey et al. |
| 6,137,499 A | 10/2000 | Tesler |
| 6,237,499 B1 | 5/2001 | McKoy |
| 6,249,768 B1 | 6/2001 | Tulskie, Jr. et al. |
| 6,259,451 B1 | 7/2001 | Tesler |
| 6,285,366 B1 | 9/2001 | Ng et al. |
| 6,292,830 B1 | 9/2001 | Taylor et al. |
| 6,327,551 B1 | 12/2001 | Peterson et al. |
| 6,396,488 B1 | 5/2002 | Simmons et al. |
| 6,411,936 B1 | 6/2002 | Sanders |
| 6,496,208 B1 | 12/2002 | Bernhardt et al. |
| 6,609,098 B1 | 8/2003 | DeMarcken |
| 6,646,652 B2 | 11/2003 | Card et al. |
| 6,738,736 B1 | 5/2004 | Bond |
| 6,897,885 B1 | 5/2005 | Hao et al. |
| 7,171,407 B2 | 1/2007 | Barton et al. |
| 7,171,618 B2 | 1/2007 | Harrington et al. |
| 7,257,588 B2 | 8/2007 | Keith, Jr. |
| 7,346,529 B2 | 3/2008 | Flores |
| 7,831,526 B1 | 11/2010 | Crawford et al. |
| 2001/0049846 A1 | 12/2001 | Guzzi et al. |
| 2002/0147626 A1 | 10/2002 | Zagotta et al. |
| 2003/0069869 A1 | 4/2003 | Gronau et al. |
| 2004/0039619 A1 | 2/2004 | Zarb |
| 2004/0073442 A1 | 4/2004 | Heyns et al. |
| 2004/0107131 A1 | 6/2004 | Wilkerson et al. |
| 2004/0111255 A1* | 6/2004 | Huerta et al. .................. 704/10 |
| 2004/0267785 A1 | 12/2004 | Suontausta et al. |
| 2006/0161560 A1 | 7/2006 | Khandelwal et al. |
| 2006/0173753 A1 | 8/2006 | Padmanabhan et al. |
| 2006/0188620 A1 | 8/2006 | Gutwein et al. |
| 2008/0147584 A1* | 6/2008 | Buss ............................... 706/47 |

FOREIGN PATENT DOCUMENTS

| | | |
|---|---|---|
| EP | 0717346 | 6/1996 |
| EP | 0770967 | 5/1997 |
| EP | 0978989 | 2/2000 |
| WO | 93/20510 | 10/1993 |
| WO | 95/12161 | 5/1995 |
| WO | 97/21171 | 6/1997 |

OTHER PUBLICATIONS

Fekete et al. "Excentric Labling: Dynamic Neighborhood Labeling for Data Visualization," ACM 1999, pp. 512-519.

Hightower et al. "Graphical Multiscale Web Histories: A Study of PadPrint", pp. 1-8.

Bederson et al. "A Zooming Web Browser", pp. 1-12.

Noik "Layout-Independent Fisheye Views of Nested Graphs", pp. 127-132.

Clark, J., "Customizing Common Controls" Sep. 1997: Dr. Dobbs Journal, abstract only.

Coffee, Peter "SPSS More Than a Pretty Face" Feb. 1996 PC Week.

Furnas, George W., "Generalized Fisheye Views" 1986 Human Factors in Computing Systems CHI '86 Conference Proceedings, pp. 1-8.

Lamping, et al. "A Focus+Context Technique Based on Hyperbolic Geometry for Visualization Hierarchies" Xerox Palo Alto Research Center, pp. 367-374.

Kohavi, "Bottom Up Induction of Oblivious Read-Once Decision Graphs" European Conference on Machine Learning 1994, pp. 154-169.

Friedman et al. "Finding the Optimal Variable Ordering for Binary Decision Diagrams" ICCC Transactions on Computers, vol. 39, No. 5 May 1990, pp. 710-713.

Covaliu, Zvi, "Decision Analysis: Concepts, Tools and Promise" Fair Isaac White Paper, pp. 1-17.

Efron & Tibshirani, *An Introduction to the Bootstrap* (1993), TOC, preface, and index only.

Brian R. Gaines, "Transforming Rules and Trees into Comprehensible Knowledge Structures," Knowledge Discovery in Databases II. AAAI/MIT Press 1995, pp. 1-18.

U.S. Appl. No. 11/845,291, filed Aug. 27, 2007, Crawford.

Pook, Stuart, et al. "Context and Interaction in Zoomable User Interfaces," (ACM Press) pp. 227-231 & 317, May 2000, Palermo, Italy.

Sarkar et al. "Graphical Fisheye View of Graphs," ACM 1992, pp. 83-91.

Bederson et al. "Pad++: A Zoomable Graphical Interface for Exploring Alternative Interface Physics," ACM 1994, pp. 17-26.

* cited by examiner

CONSTRUCTION OF DECISION LOGIC WITH GRAPHS

REFERENCE TO RELATED APPLICATION

This application claims priority under 35 USC §119 to Indian Patent Application No. 1846/DEL/2007, filed on Aug. 31, 2007, entitled: "Action-Stitching Construction of Strategies", the contents of which are hereby incorporated by reference.

TECHNICAL FIELD

The subject matter described herein relates to the construction of decision logic with graphs and related user interfaces.

BACKGROUND

Hierarchical structures composed of nodes and links can represent various decision logic. Decision logic can represent a series of decisions that divide a population into subsets. The decisions can be made on the basis of the values of one or more variables. Decision logic can be used to assign a single course of action (which could be to take no action at all) to each population subset. One example of decision logic is described in the U.S. Pat. No. 7,000,199, incorporated by reference hereto in its entirety.

SUMMARY

In one aspect, data characterizing a plurality of related action graphs is received. Thereafter, the plurality of related action graphs are transformed into a logically equivalent structure so that rendering of the logically equivalent structure can be initiated.

The plurality of related action graphs can be transformed into structures such as a decision tree, a directed acyclic graph (DAG), and an exception-based directed acyclic graph (EDAG).

The transforming can include detecting one or more cases in which there is no corresponding assigned action and/or it can include detecting one or more cases in which there are two or more corresponding assigned actions.

In another interrelated aspect, action nodes are removed from all of two or more action graphs and the logic of these action graphs are combined to form a union graph. Thereafter, a true graph having true nodes for each variable in the union graph is generated so that the union graph can be subtracted from the true graph to result in a gap graph. The gap graph can then be presented to the user. User-generated input can be received via a graphical user interface that assigns a single action to each gap identified in the gap graph.

In another interrelated aspect, decision logic of two or more action graphs can be combined to allow for the generation of a list of overlapping action sets based on leaf nodes in the combined logic having more than one action. The list of overlapping action sets can be presented to a user. User-generated input can be received via a graphical user interface that assigns a single action to each overlap identified in the list of overlapping action sets.

In still another interrelated aspect, user-generated input is received via a graphical user interface generating or modifying a hierarchical decision logic structure. Gaps or overlaps in the hierarchical decision logic structure are visually identified so that user-generated input can be received that corrects any gaps or overlaps. Thereafter, generation of the hierarchical decision logic structure can be initiated.

The hierarchical decision logic structure can be a directed acyclic graph in which the gaps are defined by conditions for which there is no path in the directed acyclic graph leading from a start node to an action node. The overlaps can be defined by conditions for which there are two or more paths in the directed acyclic graph leading from a start node connecting to different action nodes.

The hierarchical decision logic structure can also be an exception-based directed acyclic graph. The overlaps for an EDAG can be defined by conditions for which there are two or more paths in the exception-based directed acyclic graph leading from a start node and connecting to different action nodes.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

An action graph is a set of nodes connected by links that visually describes the population subset that is assigned a particular action by the decision logic. An action graph has a single root node (or start node) and it has a single action node. Each node has either a single link going towards the action node, or one or more links going towards condition nodes. Each link can go towards a node that has links coming in from other nodes. That is, nodes can have more than one parent node. In an action graph, you cannot set up links in such a way that introduces cycles in the graph.

An action graph represents a decision process to determine whether to assign the action represented by the action graph or not. Each condition node corresponds to one of the decisions in the strategy. Beginning at the start node, you follow each link to either an action node or a condition node. If you reach a condition node and the condition at that node is true, then you can proceed down one of its arcs. If you reach a condition node and the condition at the node is false, then you have to back up and try following other links from previously visited nodes. If you can reach the action node, then the action represented by this action graph is assigned. When there are no paths to the action node where all the decision conditions are true, this action represented by this action graph is not assigned.

Decision logic, then, can be represented as a set of action graphs, with one action graph for each action that can be assigned by the decision logic.

Figure 1:
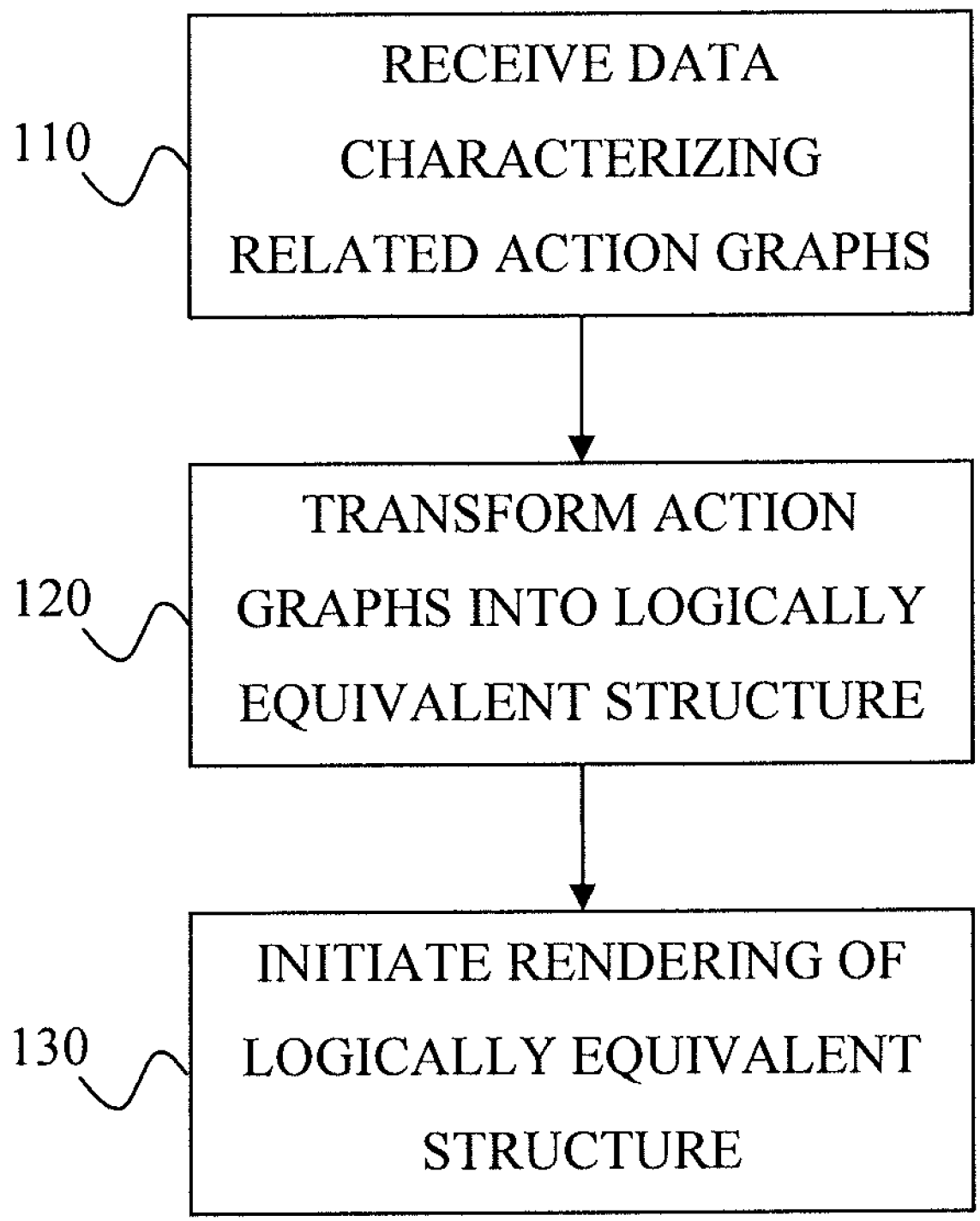
FIG. 1 is a process flow diagram illustrating the transformation of a plurality of related action graphs into a logically equivalent structure.

FIG. 1 is a process flow diagram 100 in which, at 110, data characterizing a plurality of related action graphs is received. Thereafter, at 120, the plurality of related action graphs are transformed into a logically equivalent structure. Rendering of the logically equivalent structure can, at 130, be initiated.

The subject matter described herein enables a user to specify decision logic by directly manipulating multiple action graphs, and then merging these action graphs into a single decision logic with a process called "action stitching". Decision logic with action graphs can be constructed using, for example, an action graph editor providing a graphical user interface for a user.

The graph editor can be a user interface that supports the construction of a single action graph at a time, separate from the other action graphs that comprise the strategy. The user interface can present the same display of an action graph such that it appears as a network of linked nodes between a start node and an action node to visually depict the subpopulation that should be assigned the action represented by the action graph. In particular, the user interface includes GUI controls to construct an action graph directly, by creating, editing and deleting condition nodes directly and by creating, editing and deleting the links between those nodes directly. The user interface can incorporate various techniques for displaying action graphs such as those found in co-pending patent application U.S. patent application Ser. No. 12/201,400 "Visualization of Decision Logic" filed on Aug. 29, 2008, the contents of which are hereby incorporated by reference.

The current subject matter also provides algorithms and a corresponding user interface to detect, describe, and fix "gaps" and "overlaps". When decision logic is used to assign one, and only one, action in all cases, then constructing the decision logic with a set of action graphs can result in two types of logical problems. The first problem is a "gap", which occurs when the set of action graphs constructed by the user allows the possibility that no action is assigned to some cases, because none of the action graphs includes the conditions for those cases. The second problem is an "overlap", which occurs when the set of action graphs constructed by the user allows the possibility that two or more actions are assigned to some cases, because two or more of the action graphs include the conditions for those cases.

Tools to detect, describe, and fix the gaps and overlaps in a set of action graphs make construction by action graphs a viable method to specify this type of decision logic. The graph editor disclosed herein can also include a facility to quickly fix gaps and overlaps by allowing a user to assign a single action to each gap and overlap.

The complete decision logic can be composed by assembling together the logic from each of a plurality of action graphs, a process called "action stitching". The action graphs can then be transformed to a logically equivalent form such as a decision tree, a directed acyclic graph, or an exception-based directed acyclic graph (for more information regarding DAGs and EDAGs see U.S. patent application Ser. No. 12/201,400 "Visualization of Decision Logic" filed on Aug. 29, 2008. The ability to transform into a logically equivalent structure can be advantageous because often there are particular requirements regarding the form of the decision logic when it is deployed to assign actions in a runtime environment. For example, the decision logic must be provided in the form of a decision tree when deployed. Action stitching, then, is necessary to convert the set of action graphs to a decision tree so that this decision logic can be deployed.

Decision logic can also be constructed with a DAG or an EDAG. The capabilities required to do so are very similar to those needed for construction by action graphs. For example, a DAG and EDAG editor can be provided that allows a user to construct the DAG or EDAG by directly manipulating the nodes and links of the DAG or EDAG. In addition, gaps and overlaps in both DAGs and EDAGs can be detected, reported, and fixed. A DAG can contain a gap, which are conditions that are not assigned any action according to the specified DAG. That is, there is no path for those conditions in the DAG. A DAG or an EDAG can contain an overlap, which are conditions that are assigned to two or more actions according to the specified DAG or EDAG. That is, there are two or more paths for those conditions that lead to different actions. Once a DAG or EDAG without gaps or overlaps is constructed, the decision logic is complete. It can then be converted to a logically equivalent form, such as a decision tree or a set of action graphs.

A graphic editor (including a corresponding user interface) is provided that allows a user to construct a DAG, an EDAG, or an individual action graph directly. With conventional techniques, such graphs could only be viewed by running an algorithm that computes the DAG, the EDAG, or the action graphs that are logically equivalent to a provided decision tree.

The user interface for the graph editor can be a "WYSIWYG" ("What You See is What You Get") editor, alternatively called a "direct manipulation", user interface. The graph editor can display the DAG, EDAG, or action graph in the same way as described and illustrated in U.S. patent application Ser. No. 12/201,400 "Visualization of Decision Logic" filed on Aug. 29, 2008. For example, the graph editor can display an action graph with a start node (or start "ground line"), an action node (or end "ground line"), and zero or more condition nodes in between, with one or more links connecting the nodes to each other or to the ground lines. While the examples described herein refer to visualizing action graphs in leveled form, action graphs in unleveled form can also be presented.

The graph editor's user interface can provide a set of GUI controls that allows the user to make changes to the displayed graph directly, whether that graph is a DAG, an EDAG, or an action graph. The user interface can include a control to add a condition node. In a leveled graph, the new condition node can be added to a particular level. This implicitly specifies the variable tested with the condition.

The user interface can include control for editing the condition of a condition node. In an unleveled graph, this can include specifying the variable tested with this condition. In both leveled and unleveled graphs, this specifying can include a description of the rest of the test, for example, comparing the value of the variable to some threshold.

The user interface can also include a control for deleting a condition node, and/or creating or deleting the start node and action nodes. In an action graph, the start node and action node can be created automatically with the creation of a blank action graph, and would not ever need to be deleted.

A control can also be included that changes the action assigned to an exception node in an EDAG.

A control can also create a link between two nodes. A link can be created between the start node (or start "ground line") and any condition node, the action node (or end "ground line') and any condition node, or between the start node (or start "ground line") and the action node (or end "ground line"). In an unleveled graph, a link can be created between any two condition nodes. In a leveled graph, a link can be created between any two condition nodes that are in different levels. A control can be used to delete a link between two nodes.

A control can be provided to create a new level for a leveled graph. For example, such a control can insert a new level after all the levels already added to the graph, or it can insert a level between two levels already added to the graph.

A control can be provided to allow for the deletion of a level. Another control can enable clipboard commands such as Cut, Copy and Paste that allow a group of nodes, and the connections between those nodes, to be duplicated quickly. A control can enable a "Find and Replace" operation that changes the conditions of multiple nodes at once. For example, all nodes with conditions checking a certain key and threshold can have that threshold changed to a different value.

Figure 2:
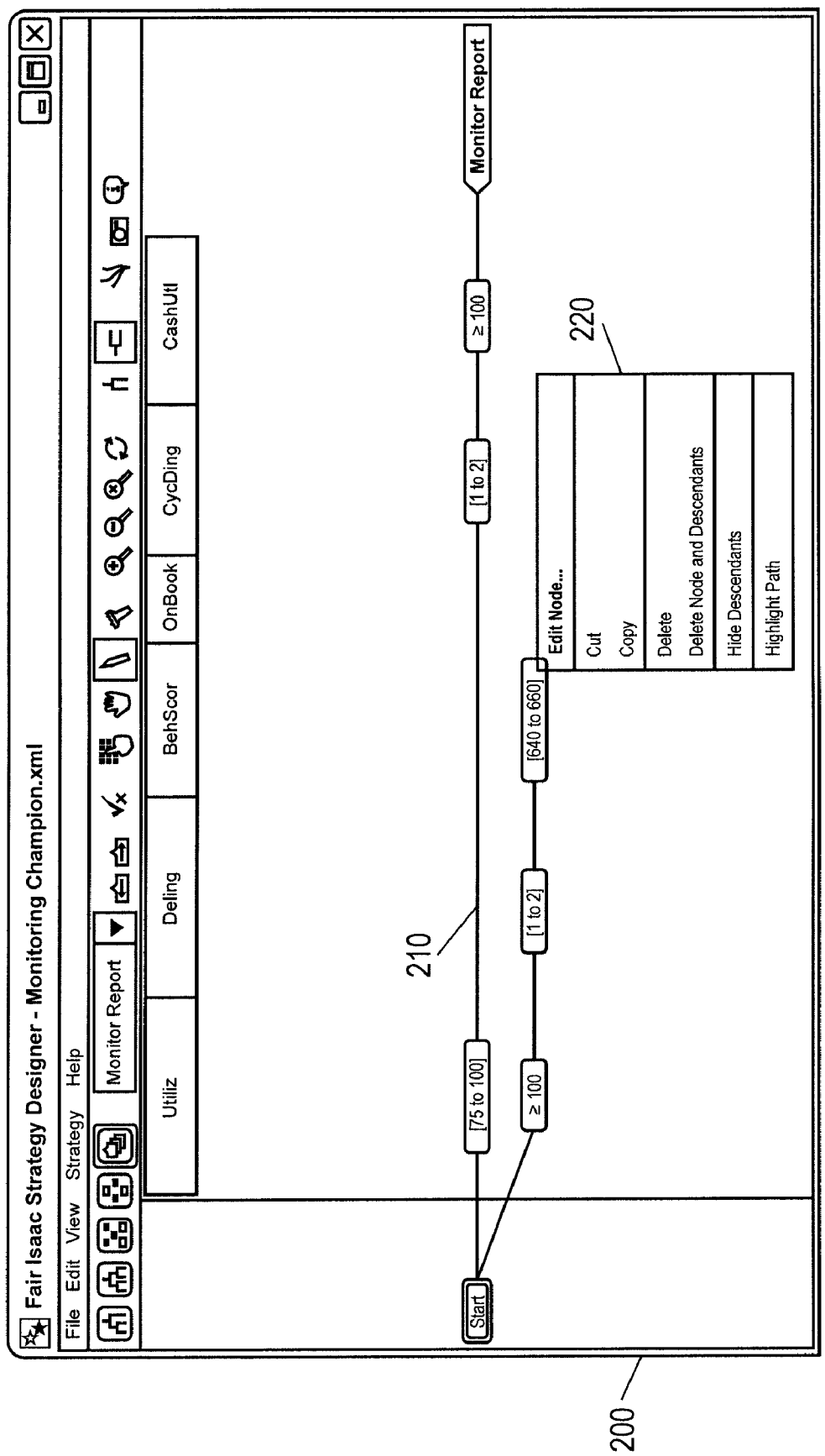
FIG. 2 is a screenshot illustrating a user interface of a graph editor being used to construct an action graph.

FIG. 2 is a screenshot 200 of the user interface of the graph editor, here being used to construct an action graph 210. An incomplete action graph 210 is depicted because there is no outgoing link from the [640 to 660) node. This node can be rendered in a visually distinctive manner (e.g., red color, etc.) to draw attention to the missing link. When a user right clicks any of the condition nodes, a context menu 220 can be displayed allowing the user to edit the condition of the clicked node, delete the node, etc.

The graph editor can include context menu controls and/or a "quick edit" tool mode. The context menu can be rendered, for example, right-clicking nodes or the canvas. The "quick edit" tool, when selected, can implement common changes to the graph, such as adding a new node, adding a link, removing a link, and changing the condition of a node. When using the "quick edit" tool, graph editing operations can be performed with simple clicks and drags using the left mouse button instead of with the more cumbersome right-click context menu. For example, a left click on a blank area of the canvas can create a new condition node. A left drag between two nodes without a link can add a link between the two nodes. A left drag between two nodes with a link can remove the link between them.

A graph can be considered as not well-formed unless every node (except the start node or start ground line) has an incoming link and every node (except the action nodes) has an outgoing link. An incoming link is a link that is part of a path to the start node. An outgoing link is a link that is part of a path to an action node. Also, the graph can also be considered to be not well-formed if the condition of any node is not specified in full. The graph editor can detect such problems as soon as they are made and mark the associated node(s) in a visually distinctive manner (e.g., red, etc.) to draw attention to those nodes to be fixed.

When the graph editor is used to edit action graphs, it can provide controls to specify which actions should have action graphs and to choose which action graph to display for editing. With these controls, the user can specify the entire set of action graphs that comprise the desired decision logic.

An action graph editor can enable a user to choose a "default action". If there are any conditions that are not assigned an action by the constructed action graphs, then those conditions can automatically be assigned the "default action". This is a convenience option, because without this ability, the user would have to construct an action graph for the default action as well to represent the complete decision logic.

The graph editor can be configured to allow the user to construct a DAG, EDAG, or action graph that permits backtracking. A graph that permits backtracking will allow the start node or condition nodes to have two or more outgoing links to condition nodes, and two or more of those conditions nodes can evaluate to true for some cases. In this kind of graph, when a case is evaluated, one of those condition nodes is first explored to determine if it is on a path toward an action node. If it is later determined that it is not on a path, then the user can backtrack and explore the other condition nodes that were true. In this way, the user can determine if there is any path between the start node and an action node. If so, the action that this action node represents can be assigned to the case.

If the user so desires, he or she can use the same editor to specify an action graph that does not need backtracking. However, an action graph that permits backtracking will often have fewer nodes and links than the equivalent action graph that does not need backtracking. So in some implementations of the graph editor, the user can specify the action graph in either form.

When a set of action graphs is used to represent decision logic meant to assign one, and only one, action under all conditions, they can have logic problems called gaps and overlaps. In a "gap", there are some conditions that are not included in any of the action graphs, so no action would be assigned to those conditions. In an "overlap", there are some conditions that are included in two or more of the action graphs, so multiple actions would be assigned to those conditions.

It is possible for a user to find gaps and overlaps in a set of action graphs by manually inspecting them, and to remove the gaps and overlaps by editing the action graphs directly to adjust their logic. However, this is an extremely difficult, mentally taxing, and error prone process. The current subject matter allows for a user to find and fix gap and overlap problems automatically making action graphs a viable method to construct complex decision logic.

A gap in a set of action graphs can be detected which allows for the conditions that comprise the gap to be determined. If the user has specified a default action, however, there will be no gap, because all conditions not included in any of the action graphs will be assigned the default action.

One or more overlaps can also be detected so that the conditions that comprise each overlap can be determined. One overlap can be considered apart from another overlap if the combination of actions assigned to those overlaps is different. For example, one overlap might have the actions "Action A" and "Action B" assigned to it, while another overlap might have the actions "Action B" and "Action C" assigned to it, while a third overlap might have the actions "Action A", "Action B", and "Action C" assigned to it. Other techniques to split up the overlaps can be used. For example, a single overlap can be determined that includes all conditions that are assigned two or more actions.

A gap graph can be computed from two or more action graphs by: (1) removing the action nodes from all the action graphs and combining the logic of these graphs with a "union of graphs" algorithm to form the union graph; (2) creating a true graph, which is a graph with true nodes for each variable; and (3) using a "subtraction of graphs" algorithm to subtract the union graph from the true graph, resulting in the gap graph.

A "union graph" combines the logic of input graphs. Any decision path that is present in any of the input graphs will be also present in the "union graph". An "intersection graph" describes the common logic that is present in all the input graphs. Any decision path that is present in all the input graphs will also be present in the "intersection graph". A "subtraction graph" describes the logic that is present in one graph but not in other. When graph B is subtracted from graph A, then the "subtraction graph" will contain the decision paths of graph A that are not present in graph B.

A "true graph" is a graph which has true nodes for all the variables of the graph. A "true node" for a variable is a node that has the condition covering the entire domain or range of values. In other words "true graph" covers the entire range of values for all the variables. Such graph can be created by adding a "true node" for every variable and by connecting these nodes.

As conditions with different overlapping actions can be split into different overlaps, there can be multiple overlap graphs. In a graph with n actions, there can be up to $(2^n-n-1)$ possible overlap graphs. For example, with actions A, B, and C, we could have overlap graphs for:

A and B
A and C
B and C
A, B and C

Which is $2^3-3-1=4$ as listed above.

The amount of time and resources required to compute all such action graphs can be costly. For this reason, the number of overlaps and the exact set of actions involved in those overlaps can be determined. Thereafter, the actual overlap graph can be computed as it is needed, usually to display in the user interface.

One algorithm to determine the number of overlaps and the exact set of actions involved in those overlaps can include combining the logic of all the action graphs by using the "union of graphs" algorithm. For paths with overlaps, the leaf node at the end of the path will have more than one action. Therefore, a list of "overlapping actions sets" can be composed by iterating over all the leaf nodes which have more than one action.

An algorithm to compute an overlap graph for a particular action-set can comprise running an "intersection of graphs" algorithm on the action graphs for just the actions belongs to that action set.

Figure 3:
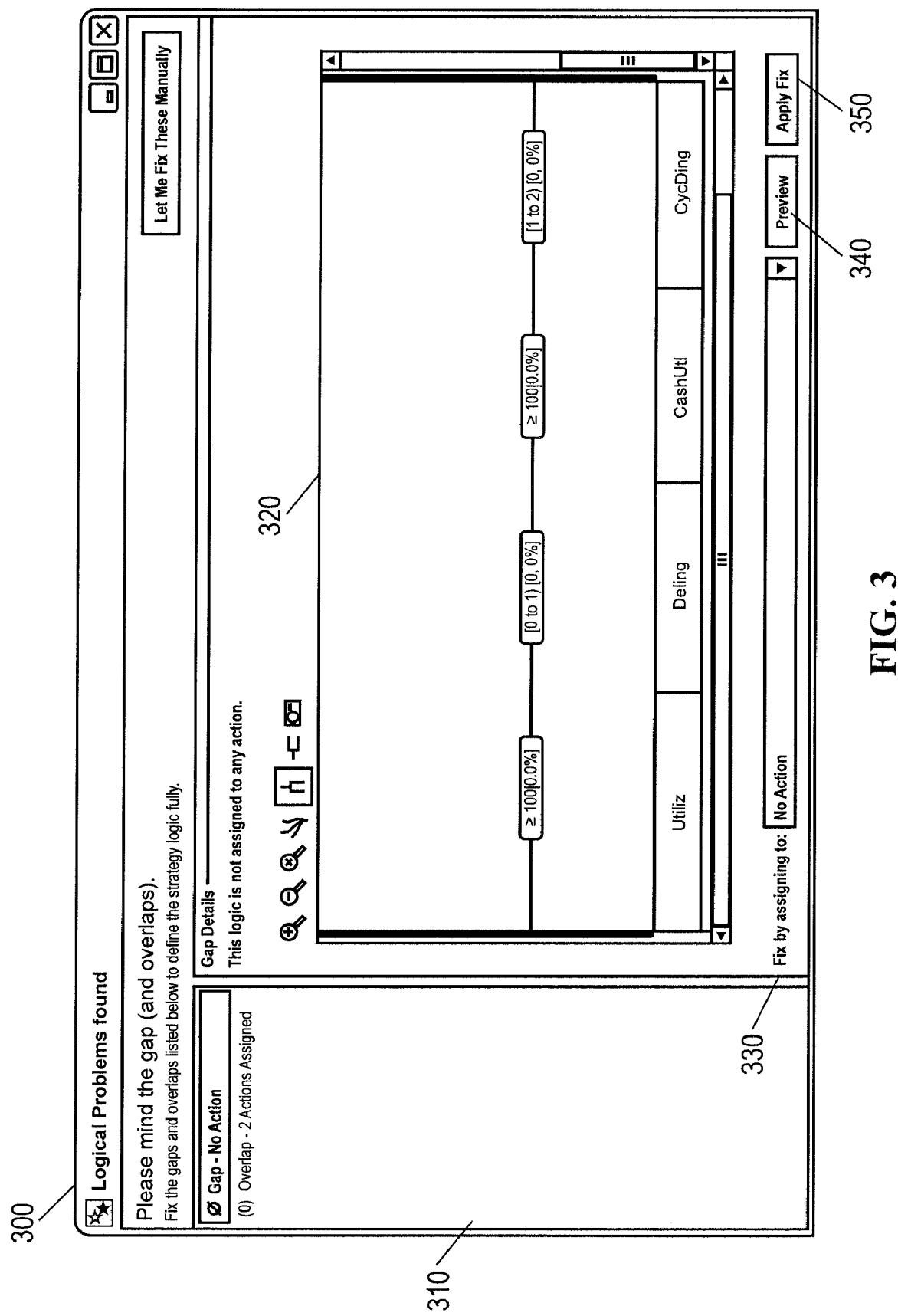
FIG. 3 is a screenshot illustrating a user interface for reporting and fixing gaps and overlaps.

FIG. 3 is a screenshot 300 of a user interface for reporting and fixing gaps and overlaps (in this example, the set of action graphs has one gap and one overlap). The user interface includes a listbox 310 in which all the gaps and overlaps found are listed. The user can then select one of these gaps or overlaps to get more information characterizing such gap or overlap. In this example, the gap is selected in the listbox 310 on the left to display more detailed information about it in information box 320. The gap is described in more detail with a gap graph, which visually depicts the logic that is included in this gap.

Gap graphs and overlap graphs can be similar to action graphs. They can consist of a start node (or start "ground line"), a terminal node (or end "ground line"), zero or more condition nodes, and links connecting all these nodes. Such graphs can visually depict the logic describing all cases that fall into the gap or into a particular overlap. That is, if a case is in the gap, then there will be a path in the gap graph, from the start node to the terminal node, with conditions that include that case. If a case is in the overlap, then there will be a path in the overlap graph, from the start node to the terminal node, with conditions that include that case.

For example, the gap graph 300 illustrated in FIG. 3 depicts the gap:

Utiliz$\geq$100 AND
Delinq is in the range [0 to 1) AND
CashUtl$\geq$100 AND
CycDlnq is in the range [1 to 2)

which means that any case where this expression evaluates to true is not being assigned any action in the action graphs.

Algorithms and user interface controls can be provided to quickly fix a gap or overlap by assigning the conditions in the gap or overlap to a single action chosen by the user.

For example, in screenshot 300 of FIG. 3, a combo box 330 at bottom labeled "Fix by assigning to:" shows the choice "No Action". If the user clicks the "Apply Fix" button 350, all the conditions in the depicted gap will be assigned "No Action". The user can also click the "Preview" button 340 to see the effects of this fix on the action graphs before committing to the change.

When a gap is fixed by assigning a single action to it, the action graph for that action can be modified to incorporate the conditions that formerly belonged to the gap. For example:

Assign gap to action X: modify the action graph of action X to include all the conditions in the gap.

That is:

Set(Action Graph of Action $X$)=UNION of(Action Graph of Action $X$)and(Gap Graph)

When an overlap is fixed by assigning a single action to it, the action graphs for all the actions that were involved in this overlap, other than the one for the chosen action, can be modified to remove the conditions that formerly belonged to the overlap. For example, there is an overlap that is assigned actions A, B, and C. The user chooses to fix this overlap by assigning it to action C. The action graphs for action A and B will be modified to remove the conditions included in this overlap.

Another example:

Assign overlap to action Y: remove overlap from action graphs of all actions involved in the overlap except action Y.

That is:

Set(Action Graph of Action #1 other than Action $Y$)= (Action Graph of Action #1)MINUS(Overlap Graph).

Set(Action Graph of Action #2 other than Action $Y$)= (Action Graph of Action #2)MINUS(Overlap Graph)

The Action Graph for Action Y remains untouched.

There are other possible methods to fix gap and overlap problems quickly and automatically. For example, the user can specify logic as a decision tree to conditionally assign some of a gap (or overlap) to one action and assign the rest to other actions. Because a decision tree assigns a single action in all cases, the gap or overlap will be fixed by applying the actions according to the logic of the decision tree.

Alternatively, an algorithm can use data with a performance variable to automatically determine the best action to assign to the gap or overlap. This algorithm can select the best single action to assign to the whole gap or overlap. Or, the data can be used to determine an optimal decision tree to conditionally assign one action to part of the gap or overlap, and other actions to the remaining parts of the gap or overlap.

When a DAG is used to represent decision logic meant to assign one, and only one, action under all conditions, it can also have gaps and overlaps. A gap in a DAG is conditions for which there is no path in the DAG leading from the start node to an action node. An overlap in a DAG is conditions for which there are two or more paths in the DAG leading from the start node, but connecting to different action nodes.

When an EDAG is used to represent decision logic meant to assign one action under all conditions, it can have overlaps. An overlap in an EDAG is a condition for which there are two or more paths in the EDAG leading from the start node, but connecting to different action nodes. It is not possible for an EDAG to have a gap. This is because if there are conditions for which there is no path in the EDAG leading from the start node to an action node, then those conditions are assigned the exception action.

The graph editor can have the same capabilities for detecting, reporting, and fixing gaps and overlaps in DAG's and EDAG's as it does for action graphs. That is, the graph editor can also detect gaps and overlaps in a DAG and overlaps in an EDAG. It can also determine the conditions included in a gap or overlap in a DAG or an overlap in an EDAG. It can report each gap or overlap to the user using a gap graph or an overlap graph. Finally, it can fix the DAG or EDAG quickly by automatically modifying its logic to have the same effect as assigning a single action chosen by the user for each gap or overlap.

Information about overlaps can be displayed using the original graphs. That is, if a user creates a DAG or EDAG with overlaps present, nodes involved in the overlap are marked in a visually distinctive matter (e.g., red, etc.) to draw attention to them for manual fixing.

As stated above, action stitching is the process by which complete decision logic can be composed by merging together logic from separate action graphs. Once the complete decision logic is composed, it can be transformed into another representation of that logic, such as an unleveled decision tree, a leveled decision tree, an unleveled DAG, a leveled DAG, an unleveled EDAG, or a leveled DAG.

Often, there are requirements regarding the form of decision logic when it is deployed to make decisions. For example, the decision logic must be deployed in the form of a leveled tree. So if the user is constructing the decision logic with action graphs, action stitching is critical for transforming it into a form that can be deployed.

Action stitching can also allow a user to see the decision logic that has been constructed with action graphs in a different form, to gain a different perspective. For example, it may be easier to get a big picture view of all the decision logic by seeing it in the form of a DAG or EDAG instead of separate action graphs. Or, seeing the decision logic in the form of a decision tree will reveal insights into the subpopulations being treated differently by this decision logic.

One action stitching algorithm can take action graphs that have different level orderings. For example, one action graph might have levels in the order of "Key A", "Key B", "Key C". Another action graph might have levels in the order of "Key C5", "Key B", "Key A". These two action graphs can be stitched together into a complete decision logic that uses the same level ordering. In one implementation, the complete decision logic can use a level ordering that is optimal or close to optimal, in that it minimizes the number of nodes needed to express the complete decision logic. But in other implementations, this level ordering can be derived in another way, such as using a level ordering specified by the user.

Action stitching can include applying a union of graphs algorithm on all the action graphs. If there are no gaps or overlaps found in the union graph, the action stitching was successful. From this union graph, the logic can be transformed to another form, such as a leveled decision tree using a logic transformation algorithm.

A user interface can be provided that allows the same decision logic to be viewed in alternative forms, such as unleveled tree, leveled tree, DAG, EDAG, or a particular action graph, with the click of a button (see, for example U.S. patent application Ser. No. 12/201,400 "Visualization of Decision Logic" filed on Aug. 29, 2008. The current graph editor can allow the user to construct or edit the decision logic in any of those alternative forms. So, the user can construct the decision logic using action graphs, but view it in the form of a logically equivalent decision tree or EDAG (using "action stitching"). Or, the user can construct the decision logic using a decision tree, but then view it as a logically equivalent set of action graphs. The user can then make a change to one of those action graphs, and then see the logically equivalent decision tree that incorporates those changes.

Decision logic can be viewed in multiple, equivalent forms, and any of those forms can be edited at any time (referred to herein as parallel editing). Parallel editing can be implemented by the user starting construction of the decision logic in any form: as a decision tree, as a DAG, as an EDAG, or as a set of action graphs. The user can also import into the editor the decision logic in any form: as a decision tree, as a DAG, as an EDAG, or as a set of action graphs.

If the decision logic the user is viewing is logically complete, that is, all the graphs defining this decision logic are well-formed and there are no gaps or overlaps present, then the user can switch to view this logic in any of the other forms. If the user tries to switch forms and one of the graphs is not well-formed, an error message can be displayed so that it can be fixed before continuing.

If the user tries to switch forms and there are gaps or overlaps present, the descriptions of the gap or overlaps can be reported. Tools can be provided to fix the gap or overlaps, or fix those problems manually, before continuing.

If the user tries to switch forms and all the logic is well-formed and free of gaps and overlaps, then it can be checked whether the new form has already been computed and has not been invalidated since being computed. If so, the logic can be displayed in this new form quickly without having to recompute it. Otherwise, the logic can be computed using a logic transformation algorithm. This newly computed form can be saved for quick access later, both in memory and in a file. This also has the benefit that a new form is not computed unless the user has requested to see it or use it. In this way, if the user views the decision logic in several forms without making edits, the logic can be saved in multiple forms, both in memory and in a file.

The user can edit the decision logic in any form when it is currently displayed in the user interface. When edits are made in the displayed form in a way that changes the meaning of the decision logic (that is, edits are made to change the mapping of conditions to assigned actions in some way), the other saved forms are invalidated.

If the user switches back to view decision logic in a form that has been invalidated, that invalidated form can be recomputed by transforming the decision logic that was just edited.

If a user is editing the decision logic in a first form, then switches to a second form and makes edits there, it will cause the first form to be invalidated and recomputed when displayed later. The user may not want this result because the decision logic they were editing originally is replaced with decision logic computed from the second form. For this reason, the user can be warned when making the first edit to the decision logic in the second form about the consequence of this action.

The user can change the level ordering in the displayed form at any time, as long as the displayed form is a leveled structure and the decision logic it depicts is well-formed and free of gaps and overlaps. This can be either a custom level ordering specified by the user, or an automatically determined optimal level that minimizes the number of nodes in the structure. Changes in level ordering do not invalidate the other forms, because these changes do not change the meaning of the decision logic (that is, changes in level ordering do not change the mapping of conditions to assigned actions in any way).

The user can save to file the decision logic being edited in the currently displayed form at any time. The decision logic can be saved to file even if it is not well-formed or if it contains gaps or overlaps.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:
    removing action nodes from all of two or more action graphs and combining the logic of these graphs to form a union graph;
    creating a true graph having true nodes for each variable in the union graph;
    subtracting the union graph from the true graph to result in a gap graph; and
    presenting the gap graph to a user.

2. An article as in claim 1, wherein the tangible machine-readable storage medium further embodies instructions that when performed by one or more machines result in operations comprising:
    receiving user-generated input via a graphical user interface assigning a single action to the gap identified in the gap graph.

3. An article comprising a non-transitory machine-readable storage medium embodying instructions that when performed by one or more machines result in operations comprising:
    combining decision logic of two or more action graphs;
    generating a list of overlapping action sets based on leaf nodes in the combined logic having more than one action;
    presenting the list of overlapping action sets to a user; and
    receiving user-generated input via a graphical user interface assigning a single action to each overlap identified in the list of overlapping action sets.

4. An article comprising a non-transitory machine-readable storage medium embodying instructions that when performed by one or more machines result in operations comprising:
    receiving user-generated input via a graphical user interface generating or modifying a hierarchical decision logic structure;
    visually identifying gaps or overlaps in the hierarchical decision logic structure;
    receiving user-generated input correcting any gaps or overlaps; and
    finalizing generation of the hierarchical decision logic structure;
    wherein the hierarchical decision logic structure is a directed acyclic graph and gaps are visually identified and the gaps are defined by conditions for which there is no path in the directed acyclic graph leading from a start node to an action node.

5. An article as in claim 4, wherein overlaps are visually identified and the overlaps are defined by conditions for which there are two or more paths in the directed acyclic graph leading from a start node connecting to different action nodes.

6. An article comprising a non-transitory machine-readable storage medium embodying instructions that when performed by one or more machines result in operations comprising:
    receiving user-generated input via a graphical user interface generating or modifying a hierarchical decision logic structure;
    visually identifying overlaps in the hierarchical decision logic structure;
    receiving user-generated input correcting overlaps; and
    finalizing generation of the hierarchical decision logic structure;
    wherein the hierarchical decision logic structure is an exception-based directed acyclic graph and overlaps are defined by conditions for which there are two or more paths in the exception-based directed acyclic graph leading from a start node and connecting to different action nodes.

* * * * *